3,122,582
NITRO ESTERS OF ORGANOBORON ALCOHOLS
Sheldon L. Clark, Orange, Conn., assignor to Olin Mathieson Chemical Corporation, a corporation of Virginia
No Drawing. Filed Oct. 17, 1961, Ser. No. 147,410
6 Claims. (Cl. 260—467)

This invention relates to nitric acid esters of organoboron alcohols and to a method for their preparation. The nitric acid esters of the organoboron alcohols of this invention are prepared by the nitration of organoboron alcohols of the type $RR'B_{10}H_8(CR''CR''')$, wherein R and R' are each hydrogen or an alkyl group containing from 1 to 5 carbon atoms and wherein R'' and R''' are each hydrogen, an alkyl radical, or a hydroxyalkyl radical containing at least 2 carbon atoms, at least one of R'' and R''' being a hydroxyalkyl radical, and the total number of carbon atoms in R'' and R''' taken together not exceeding 8. The reaction products prepared by the method of this invention are useful as fuels.

Organoboron alcohols of the type suitable for use in this invention can be prepared, for example, according to the method described in copending application Serial No. 801,960, filed March 25, 1959, of John W. Ager, Jr., and Theodore L. Heying; and Serial No. 809,570, filed April 28, 1959, of Roy P. Alexander and Theodore L. Heying.

In accordance with this invention, it was discovered that organoboron alcohols of the type $$RR'B_{10}H_8(CR''CR''')$$

wherein R, R', R'' and R''' have their previous significance can be treated with a nitrating acid to yield the corresponding nitric acid esters. Suitable nitrating acids include mixtures of nitric acid with sulfuric acid, acetic acid, acetic anhydride, phosphoric acid, etc. The nitrating acids employed preferably contain from about 55 to about 20 percent by weight of nitric acid, from about 45 to about 60 percent by weight of sulfuric acid, and from about 0 percent to about 20 percent by weight of water. Although the stoichiometric quantity of nitric acid in the nitrating acid can be employed, an excess of nitric acid can be utilized in order to insure complete reaction. Usually from about 0.5 to about 10 or more moles of nitric acid will be employed per mole of the organoboron alcohol introduced into the reactor. Generally, because of the exothermic nature of the reaction, relatively low temperatures of from about −20° C. to about +50° C. are employed. The reaction time can be varied widely from about 0.1 hour to about 10 hours or more depending upon the reaction conditions and upon the composition of the nitrating acid employed in the nitration. The nitric acid ester of the organoboron alcohol employed can be conveniently separated from the reaction mixture by first extracting the reaction mixture with a suitable solvent which can be a lower dialkyl ether such as diethyl ether. The ether extract is then neutralized with dilute sodium carbonate solution and then dried over anhydrous magnesium sulfate. After removal of the remaining ether in a rotary film evaporator, the crude product thus obtained is dissolved in an aromatic solvent such as benzene, toluene, etc., cooled on an ice bath and then filtered to remove any solid material. Finally the pure product is recovered by evaporation of the aromatic solvent.

The invention is described in greater detail in the following specific examples which are merely illustrative and are not intended to limit the scope of the invention.

*Example I*

In this experiment the nitrating acid in the amount of 35 grams (prepared from 15 grams of nitric acid (70 percent) and 20 grams of sulfuric (95.5–96.5 percent)) was charged to a 100 ml. beaker, which was equipped with a magnetic stirrer. After the acid had been added, the beaker and contents were placed in an ice-water bath. When the acid had been cooled to a temperature of about 3° C., 10 grams of an organoboron alcohol having the formula $B_{10}H_{10}[C(CH_2CH_2OH)]_2$ was added to the nitrating acid over a period of 1.08 hours. The organoboron alcohol added was a white crystalline solid. During the addition of the organoboron alcohol the reaction temperature ranged from about 3° C. to about 19° C. The reaction mixture was stirred for an additional 2.42 hours and then was poured onto crushed ice. The mixture was then extracted with three 200 ml. portions of diethyl ether. After the ether layer had been neutralized by shaking with dilute sodium carbonate solution, it was then dried over anhydrous magnesium sulfate and finally the remaining ether removed on a rotary film evaporator. The residual oil so obtained was dissolved in 25 ml. of benzene, chilled on an ice bath and filtered. Removal of the benzene by evaporation in the rotary film evaporator resulted in the recovery of 10.7 grams of the desired dinitrate ester of the organo alcohol $$(B_{10}H_{10}[C(CH_2CH_2ONO_2)]_2)$$

a light, straw colored oil, $n_D{}^{25}$ 1.5532. Based on the theoretical quantity, a yield of 77.2 percent of the dinitrate ester was obtained.

The ester was analyzed for carbon, hydrogen and nitrogen and the following results were obtained:

| | Percent C | Percent H | Percent N |
|---|---|---|---|
| Calcd. for $C_6H_{18}B_{10}N_2O_6$ | 22.35 | 5.63 | 8.69 |
| Found | 22.39 | 6.18 | 8.66 |
| | 22.30 | 6.29 | 8.87 |

*Example II*

This example was conducted in the same manner and in the same apparatus as Example I. A total of 10 grams of organoboron alcohol of the formula $$B_{10}H_{10}[C(CH_2CH_2OH)]_2$$

was added to 35 grams of nitrating acid having the same composition of that of the nitrating acid employed in Example I. The mixed acid was cooled to a temperature of about 0° C. and then the organoboron alcohol was added over a period of 0.75 hour. During this time the reaction temperature varied from 0° C. to about 10° C. After working up the reaction mixture in the same manner as described in Example I there was obtained 9.7 grams of the desired $B_{10}H_{10}[C(CH_2CH_2ONO_2)]_2$, $n_D{}^{25}$ 1.5561. Based on theoretical quantity of material, a yield of 69.8 percent was obtained.

The ester so produced was analyzed for carbon, hydrogen and nitrogen and the following results were obtained:

| | Percent C | Percent H | Percent N |
|---|---|---|---|
| Calcd. for $C_6H_{18}B_{10}N_2O_6$ | 22.35 | 5.63 | 8.69 |
| Found | 24.55 | 6.52 | 9.74 |
| | 25.48 | 6.61 | 9.48 |

The liquid compositions of this invention can be employed as fuels when burned with air. Thus, they can be used as fuels in basic and auxiliary combustion systems in gas turbines, particularly aircraft gas turbines of the turbojet or turboprop type. Each of those types is a device in which air is compressed and fuel is then burned in a combustor in admixture with the air. Following this, the products of combustion are expanded through a gas turbine. The liquid products of this invention are particularly suited for use as a fuel in the combustors of aircraft gas turbines of the types described in view of their improved energy content, combustion efficiency, combustion stability, flame propagation, operational limits and heat release rates over fuels normally used for these applications.

The combustor pressure in a conventional aircraft gas turbine varied from a maximum at static sea level conditions to a minimum at the absolute ceiling of the aircraft, which may be 65,000 feet or 70,000 feet or higher. The compression ratios of the current and near-future aircraft gas turbines are generally within the range from 5:1 to 15:1 or 20:1, the compression ratio being the absolute pressure of the air after having been compressed (by the compressor in the case of the turbojet or turboprop engine) divided by the absolute pressure of the air before compression. Therefore, the operating combustion pressure in the combustor can vary from approximately 90 to 300 pounds per square inch absolute at static sea level conditions to about 5 to 15 pounds per square inch absolute at the extremely high altitudes of approximately 70,000 feet. The liquid products of this invention are well adapted for efficient and stable burning in combustors operating under these widely varying conditions.

In normal aircraft gas turbine practice it is customary to burn the fuel, under normal operating conditions, at overall fuel-air ratios by weight of approximately 0.012 to 0.020 across a combustion system when the fuel employed is a simple hydrocarbon, rather than a borohydrocarbon of the present invention. Excess air is introduced into the combustor for dilution purposes so that the resultant gas temperature at the turbine wheel in the case of the turbojet or turboprop engine is maintained at the tolerable limit. In the zone of the combustor where the fuel is injected the local fuel-air ratio is approximately stoichiometric. This stoichiometric fuel to air ratio exists only momentarily, since additional air is introduced along the combustor and results in the overall ratio of approximately 0.012 to 0.020 for hydrocarbons before entrance into the turbine section. For the higher energy fuels of the present invention, the local fuel to air ratio in the zone of fuel injection should also be approximately stoichiometric, assuming that the boron, carbon and hydrogen present in the products burn to boric oxide, carbon dioxide and water vapor. In the case of the higher energy fuels of the present invention, because of their higher heating values in comparison with the simple hydrocarbons, the overall fuel-air ratio by weight across the combustor will be approximately 0.008 to 0.016 if the resultant gas temperature is to remain within the presently established tolerable temperature limits. Thus, when used as the fuel supplied to the combustor of an aircraft gas turbine engine, the liquid products of the present invention are employed in essentially the same manner as the simple hydrocarbon fuel presently being used. The fuel is injected into the combustor in such a manner that there is established a local zone where the relative amounts of fuel and air are approximately stoichiometric so that combustion of the fuel can be reliably initiated by means of an electrical spark or some similar means. After this has been done, additional air is introduced into the combustor in order to cool sufficiently the products of combustion before they enter the turbine so that they do not damage the turbine. Present-day turbine blade materials limit the turbine inlet temperature to approximately 1600° to 1650° F. Operation at these peak temperatures is limited to periods of approximately 15 minutes at combat conditions in the case of military aircraft. By not permitting operation at higher temperatures and by limiting the time of operation at peak temperatures, satisfactory engine life is assured. Under normal cruising conditions for the aircraft, the combustion products are sufficiently diluted with air so that a temperature of approximately 1400° F. is maintained at the turbine inlet.

The liquid products of this invention can also be employed as aircraft gas turbine fuels in admixture with the hydrocarbons presently being used, such as JP-4. When such mixtures are used, the fuel-air ratio in the zone of the combustion where combustion is initiated and the overall fuel-air ratio across the combustor will be proportional to the relative amounts of borohydrocarbon of the present invention and hydrocarbon fuel present in the mixture, and consistent with the air dilution required to maintain the gas temperatures of these mixtures within accepted turbine operating temperatures.

Because of their high chemical reactivity and heating valves, the liquid products of this invention can be employed as fuels in ramjet engines and in afterburning and other auxiliary burning schemes for the turbojet and bypass or ducted type engines. The operating conditions of afterburning or auxiliary burning schemes are usually more critical at high altitudes than those of the main gas turbine combustion system because of the reduced pressure of the combustion gases. In all cases the pressure is only slightly in excess of ambient pressure and efficient and stable combustion under such conditions is normally difficult with simple hydrocarbons. Extinction of the combustion process in the afterburner may also occur under these conditions of extreme altitude operation with conventional aircraft fuels.

The burning characteristics of the liquid products of this invention are such that good combustion performance can be attained even at the marginal operation conditions encountered at high altitudes, insuring efficient and stable combustion and improvement in the zone of operation before lean and rich extinction of the combustion process is encountered, significant improvement in the non-afterburning performance of a gas turbine-afterburner combination is also possible because the high chemical reactivity of the products of this invention eliminates the need of flameholding devices within the combustion zone of the afterburner. When employed in an afterburner, the fuels of this invention are simply substituted for the hydrocarbon fuels which have been heretofore used and no changes in the manner of operating the afterburner need be made.

The ramjet is also subject to marginal operating conditions which are similar to those encountered by the afterburner. These usually occur at reduced flight speeds and extremely high altitudes. The liquid products of this invention will improve the combustion process of the ramjet in much the same manner as that described for the afterburner because of their improved chemical reactivity over that of simple hydrocarbon fuels. When employed in a ramjet, the liquid fuels of this invention will be simply substituted for hydrocarbon fuels and used in the established manner.

What is claimed is:

1. $RR'B_{10}H_8(CR^aCR^b)$ wherein R and R' are each selected from the class consisting of hydrogen and an alkyl radical containing from 1 to 5 carbon atoms and wherein $R^a$ and $R^b$ are each selected from the class consisting of hydrogen, an alkyl radical and a radical of the formula $R''''ONO_2$ wherein $R''''$ is a divalent saturated hydrocarbon radical containing at least 2 carbon atoms, at least one of $R^a$ and $R^b$ being a $R''''ONO_2$ radical, and the total number of carbon atoms in $R^a$ and $R^b$ not exceeding eight.

2. $B_{10}H_{10}[C(CH_2CH_2ONO_2)]_2$.

3. A method for the preparation of organoboron esters which comprises reacting an organoboron alcohol of the type $RR'B_{10}H_8(CR''CH''')$, wherein R and R' are each selected from the class consisting of hydrogen and an alkyl radical containing from 1 to 5 carbon atoms, wherein $R''$ and $R'''$ are each selected from the class consisting of hydrogen, an alkyl radical and a hydroxyalkyl radical containing at least 2 carbon atoms, at least one of $R''$ and $R'''$ being a hydroxyalkyl and the total number of carbon atoms in $R''$ and $R'''$ taken together not exceeding 8, with a nitrating acid, and recovering the organoboron ester.

4. The method of claim 3 wherein the organoboron alcohol is $B_{10}H_{10}[C(CH_2CH_2OH)]_2$.

5. The method of claim 3 wherein the nitrating acid is a mixture of from about 55 to about 20 percent by weight of nitric acid, from about 45 to about 60 percent by weight of sulfuric acid and from about 0 percent to about 20 percent by weight of water.

6. The method of claim 3 wherein the organoboron alcohol is $B_{10}H_{10}[C(CH_2CH_2OH)]_2$ and wherein the nitrating acid is a mixture of about 30 percent by weight of nitric acid, about 55 percent by weight of sulfuric acid and about 15 percent by weight of water.

No references cited.

UNITED STATES PATENT OFFICE
CERTIFICATE OF CORRECTION

Patent No. 3,122,582                                                  February 25, 1964

Sheldon L. Clark

It is hereby certified that error appears in the above numbered patent requiring correction and that the said Letters Patent should read as corrected below.

Column 4, line 67, for "$RR'B_{10}H_8(CR''CH''')$" read -- $RR'B_{10}H_8(CR''CR''')$ --.

Signed and sealed this 18th day of August 1964.

(SEAL)
Attest:

ERNEST W. SWIDER                                       EDWARD J. BRENNER
Attesting Officer                                              Commissioner of Patents